United States Patent
Chi (10) Patent No.: US 7,051,231 B2
(45) Date of Patent: May 23, 2006

(54) MICROPROCESSOR SYSTEM ARCHITECTURE TO CORRECT BUILT-IN ROM CODE

(75) Inventor: Hua-Chang Chi, Tao-Yuan Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 815 days.

(21) Appl. No.: 10/064,669

(22) Filed: Aug. 5, 2002

(65) Prior Publication Data
US 2004/0025087 A1    Feb. 5, 2004

(51) Int. Cl.
*G06F 11/00*    (2006.01)
(52) U.S. Cl. .......................................... 714/8; 714/710
(58) Field of Classification Search ................. 714/8
See application file for complete search history.

(56) References Cited

U.S. PATENT DOCUMENTS

| | | | | |
|---|---|---|---|---|
| 5,357,627 A | * | 10/1994 | Miyazawa et al. ............ | 714/6 |
| 5,408,672 A | * | 4/1995 | Miyazawa et al. ............ | 712/37 |
| 5,701,506 A | * | 12/1997 | Hosotani ...................... | 712/37 |
| 5,870,601 A | * | 2/1999 | Getzlaff et al. .............. | 712/244 |
| 5,938,774 A | * | 8/1999 | Hsu ............................... | 714/6 |
| 6,023,758 A | * | 2/2000 | Kodama et al. ............. | 712/220 |
| 6,049,672 A | * | 4/2000 | Shiell et al. ................. | 717/168 |
| 6,125,068 A | | 9/2000 | Chen | |
| 6,158,018 A | * | 12/2000 | Bernasconi et al. ........... | 714/8 |
| 6,438,664 B1 | * | 8/2002 | McGrath et al. ............ | 711/154 |
| 6,804,772 B1 | * | 10/2004 | Lee et al. .................... | 712/248 |

OTHER PUBLICATIONS

Patterson et al., "7.2 The Basics of Caches", Computer Organization & Design: The Hardware/Software Interface Second Edition, Morgan and Kauffmann Publishers, 1998, pp. 545-553.*

* cited by examiner

Primary Examiner—Scott Baderman
Assistant Examiner—Gabriel Chu
(74) Attorney, Agent, or Firm—Winston Hsu (57) ABSTRACT

A microprocessor system to correct built-in ROM code includes a program counter and an address space divided into a program ROM (read only memory) space, a small address RAM that is a subset of the program ROM, a working RAM (random access memory), and a small program RAM. When the program counter accesses instructions in the program ROM, the lower bits of the program counter are simultaneously accessing an entry in the address RAM. When a valid bit of the accessed entry indicates and the page number of the accessed entry is the same as the page number in the program counter, the jump address in the accessed entry is placed into the program counter so that corrected code in the program RAM will be executed instead of the indicated faulty code in the program ROM.

9 Claims, 7 Drawing Sheets

Fig. 1

| Bit | 15 | 14 | | 8 | 7 | | 0 |
|---|---|---|---|---|---|---|---|
| | Correction | | Page number | | | Offset | |

| | |
|---|---|
| 0x0110 | I0110 |
| 0x0111 | I0111 |
| 0x0112 | I0112 |
| 0x0113 | I0113 |
| .... | .... |
| 0x0220 | I0220 |
| 0x0221 | I0221 |
| 0x0222 | I0222 |

Segment 1 to be corrected (rows 0x0110–0x0112)

Segment 2 to be corrected (rows 0x0220–0x0221)

Fig. 5A

| | | | |
|---|---|---|---|
| 0x10 | 1 | 0x01 | 0x0 |
| 0x11 | 0 | · · · · | · · · · |
| · · · · | · · · | · · · · | · · · · |
| 0x20 | 1 | 0x02 | 0x4 |
| 0x21 | 0 | · · · · | · · · · |
| · · · · | · · · | · · · · | · · · · |

Fig. 5B

| Address | Content |
|---|---|
| 0x0 | xxx |
| 0x1 | xxx |
| 0x2 | xxx |
| 0x3 | Jump 0x0113 |
| 0x4 | xxx |
| 0x5 | xxx |
| 0x6 | Jump 0x0222 |
| 0x7 | . . . . |

0x0–0x3: Correction for segment 1
0x4–0x6: Correction for segment 2

Fig. 5C

MICROPROCESSOR SYSTEM ARCHITECTURE TO CORRECT BUILT-IN ROM CODE

BACKGROUND OF INVENTION

1. Field of the Invention

The present invention relates to embedded ROM (read only memory) applications in a microprocessor system. More specifically, a device and method is disclosed that executes corrected code segments in RAM (random access memory) in place of faulty or outdated ROM code segments.

2. Description of the Prior Art

Advances in semiconductor technology have allowed the integration of microprocessors, memories, and related items into a single computer chip known as an embedded microprocessor system. Such a system will normally comprise some mask ROM (read only memory) that includes application code basic to the functionality of the microprocessor system and some RAM (random access memory) for use during processing of the code. The mask ROM is used primarily because it is relatively inexpensive, yet there is a hidden cost when the embedded code contains a bug.

Once code is written into the mask ROM, making changes to the code is a difficult, time consuming, and an expensive undertaking. If the originally written code is faulty or needs to be updated, manufacturing an entirely new microprocessor system is often preferable to attempting to implement changes in the mask ROM.

Several devices have been put forth to allow the execution of corrected code stored in the RAM portion of the memory in place of faulty or outdated code written into the mask ROM. One such device is U.S. Pat. No. 5,623,665. Built into the ROM at predetermined intervals is a command for jumping to an address X in RAM. If no patch is to be applied to the corresponding section of code, a return statement is located at the address X and normal processing continues. If the corresponding section of code is to be updated, the replacement code is located at the address X and executed before returning to the next section of mask ROM code.

Another such device is disclosed in U.S. Pat. No. 5,938,774. In this disclosure, a faulty-segment address table and a repair-segment address table is set up. A plurality of digital comparators, one for each entry in the faulty-segment address table, is used to compare the current address in a program counter with the addresses in the faulty-segment address table. An equality result from one of the digital comparators indicates that the current section of code needs corrected and the flow of control jumps to an address shown in the repair-segment address table corresponding to the entry in the faulty-segment address table. The address in the repair-segment address table contains the updated code, which is then executed before returning to the next section of mask ROM code.

A problem with the first solution is that the commands for jumping to an address X in RAM must be encoded into the mask ROM before it is known if any or how many segments of code in the mask ROM need to be replaced. Therefore, a probability of unnecessary jumps is high. Additionally, because the "X" of address X must be defined with no pre-knowledge of corrections needed, it is nearly impossible to provide continuous code and to avoid wasted RAM space without incurring additional jumps to another address.

A problem with the second solution is that there must be a digital comparator for each entry in the faulty-segment address table built into the microprocessor system, again with no foreknowledge of any or how many segments of code in the mask ROM need to be replaced. This factor can increase manufacturing costs if unneeded digital comparators are included in the microprocessor system, and can fail to work correctly if the number of digital comparators included in the microprocessor system is less than the number of segments of ROM code that need to be replaced.

SUMMARY OF INVENTION

It is therefore a primary objective of the claimed invention to reduce manufacturing costs while increasing flexibility in the number of potential replacement segments possible without redesigning a microprocessor system.

It is another primary objective of the claimed invention to provide a microprocessor system that can store code in continuous locations in RAM to repair faulty embedded ROM code, allowing easier programming and better utilization of the RAM.

Briefly summarized, the claimed invention includes a program counter and an address space divided into a program ROM (read only memory) space and a working RAM (random access memory). Additionally, a small address RAM that is a subset of the program ROM and a small program RAM is included. The address space is arranged so that the lowest addresses belong to the address RAM, the next lowest addresses belong to the program ROM, followed by the program RAM, and the working RAM has the highest addresses.

When the program counter accesses instructions in the program ROM, the lower bits of the program counter are simultaneously accessing an entry in the address RAM. Each entry in the address RAM comprises a valid bit, a page number, and a jump address. An address detection unit determines if the valid bit of the accessed entry is set to "1" and the page number of the accessed entry is the same as the page number in the program counter, indicating faulty program ROM code. To correct the faulty program ROM code, the jump address in the accessed entry is added to an offset value indicating the start of the program RAM and placed into the program counter so that corrected program RAM code will be executed instead of the original faulty code in program ROM.

It is an advantage of the claimed invention that manufacturing costs are reduced and the flexibility in the number of potential replacement segments possible without redesigning the microprocessor system is increased.

It is another advantage of the claimed invention to store correction code in continuous locations in the program RAM to repair faulty embedded program ROM code, allowing easier programming and better utilization of the program RAM.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
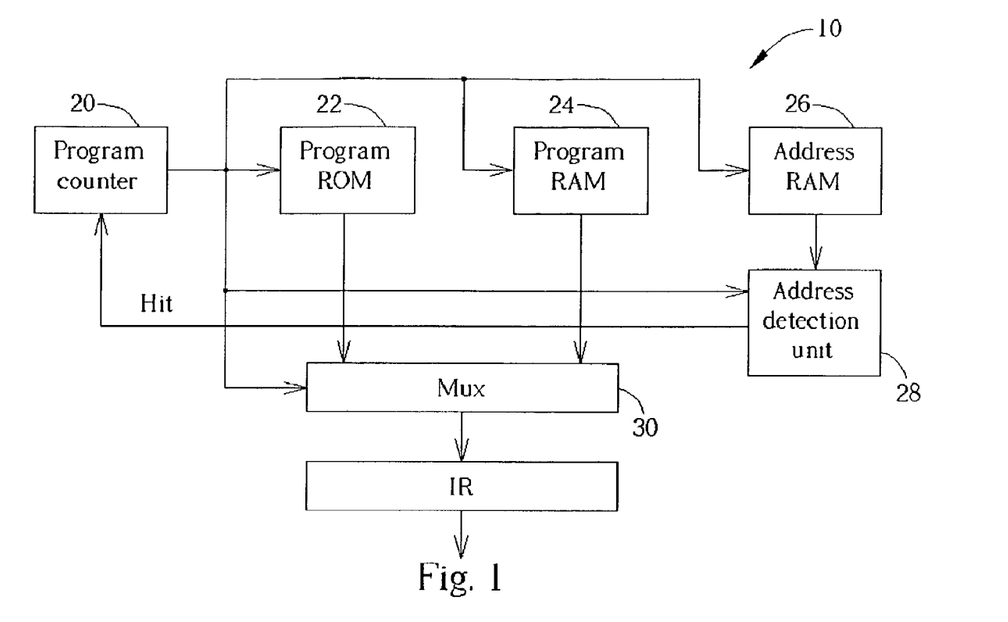
FIG. 1 is a schematic diagram of a microprocessor system according to the present invention.

Please refer to FIG. 1 of a microprocessor system according to the present invention. A microprocessor system 10 comprises a program counter 20, a program ROM 22, a program RAM 24, an address RAM 26, and an address detection unit 28. In this embodiment, the address space of the microprocessor system 10 is 64K words, where the addresses 0 to 32K−1 are in the address RAM 26 and program ROM 22 space and the addresses 32K to 64K−1 are in program RAM 24 and a working RAM space. The program RAM 24 uses 1K words and occupies the addresses 32K to 33K−1. Both the program RAM 24 and the address RAM 26 are a form of EEPROM (Erasable Electronically Programmable Read Only Memory) or SRAM (Static Random Access Memory) but the present invention is not to be limited by the type of memory used.

Figure 2:
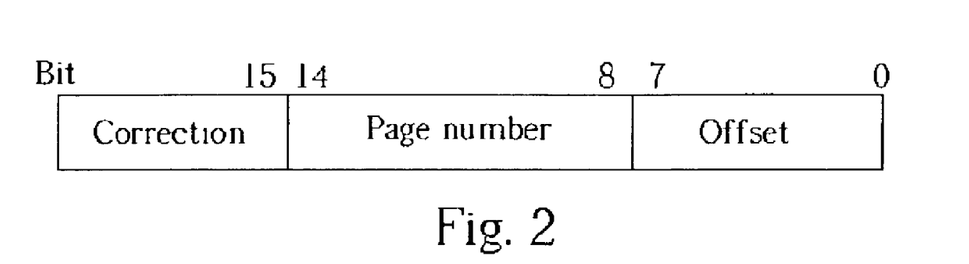
FIG. 2 is an illustration of a program counter according to the present invention.

The program counter 20 uses a 16-bit word arranged as in FIG. 2 to control application execution. Bit numbers 8–14 indicate the page number currently being processed. Bit numbers 0–7 represent an offset within the page being processed. Because the program ROM 22 space is 32K words, the 7 bit page number combined with the 8 bit offset number can provide access to any word address within the 32K program ROM 22. Bit number 15 is a correction bit and is used to determine whether an original code in the program ROM 22 or a corrected code in the program RAM 24 is to be executed. If bit number 15 is "0", the remaining 15 bits define the correct address in program ROM 22. If bit number 15 is "1", the address is too large to be within the program ROM 22 and directly corresponds to an address within the program RAM 24.

Figure 3:
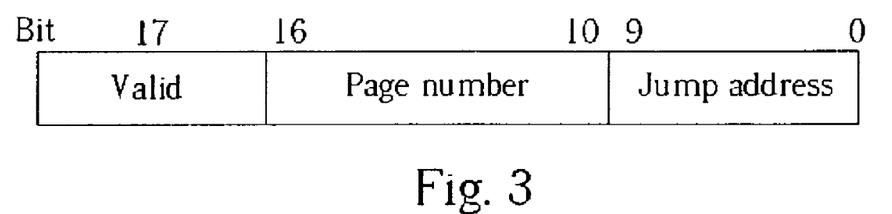
FIG. 3 is an illustration of a correction entry according to the present invention.

Please recall that the address RAM 26 is a subset of the program ROM 22 space. In this example, the address RAM 26 comprises 256 entries and each entry comprises 18 bits organized as shown in FIG. 3. Access to each of the 256 entries can be provided by 8 bits and corresponds to the 8 bit page offset within the page currently being processed. Bit number 17 is a valid bit used to indicate whether the entry contains code update information. Bit numbers 10–16 contain a page number of the page that needs to be updated. Bits 0–9 (when properly offset) contain a jump address; the address in the program RAM 24 where corrected code is located.

Figure 4:
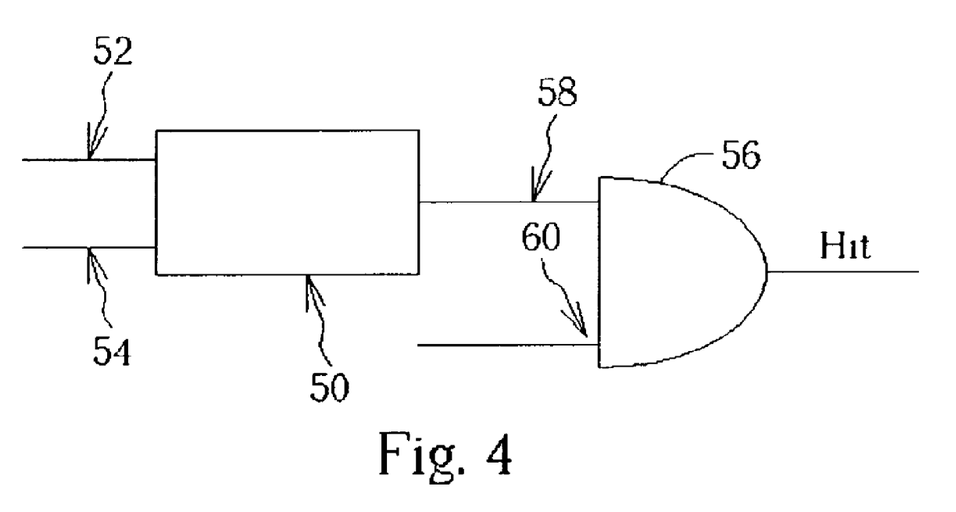
FIG. 4 is a schematic diagram of an address detection unit in the microprocessor system of FIG. 1.

The address detection unit 28 comprises a comparator 50 and an "AND" operator 56 as shown in FIG. 4. One input 52 of the comparator 50 receives the current value in the program counter 20 and another input 54 of the comparator 50 receives the output of the accessed address RAM 26. The comparator 50 compares bits 8–14 of the program counter 20 (the current page number) with bits 10–16 (a page number) of the accessed entry in the address RAM 26. The results of the comparison is sent to an input 58 of the "AND" operator 56 and bit number 17 (the valid bit) of the output of the accessed entry from the address RAM 26 is sent to another input 60 of the "AND" operator 56. If the two page numbers are the same and the valid bit is set, a hit has occurred.

A hit indicates that the current program counter 20 is the starting point for a faulty program segment. The jump address specified in the accessed entry of the address RAM 26 is added to an offset marking the beginning of the program RAM 24 and the result is placed in the program counter 20. Because the beginning address of the program RAM 24 is 32K, the offset needed is 0×8000 or the equivalent of setting bit number 15 (the correction bit) to "1". Obviously, the final instruction in a corrected code segment in program RAM 24 is an unconditional jump to a location in program ROM 22 immediately following the code in the program ROM 22 that was replaced by the code in program RAM 24.

The microprocessor system 10 further comprises a multiplexer 30 and an instruction register 32. The multiplexer 30 is arranged so that when the correction bit (bit 15) of the program counter 20 is "0", the output of the program ROM 22 is sent to the instruction register 32 for further decoding and execution. When the correction bit (bit 15) of the program counter is "1", the output of the program RAM 24 is sent to the instruction register 32 for further decoding and execution.

Unfortunately, correction of ROM code is a common necessity in today's digital world. Please refer to FIGS. 5A, 5B, and 5C that show an example of the present invention in operation. It is understood that FIGS. 5A–5C along with example memory sizes, offsets, and word lengths are given only to clarify the invention and should not be construed as claim limitations.

Figure 5A:
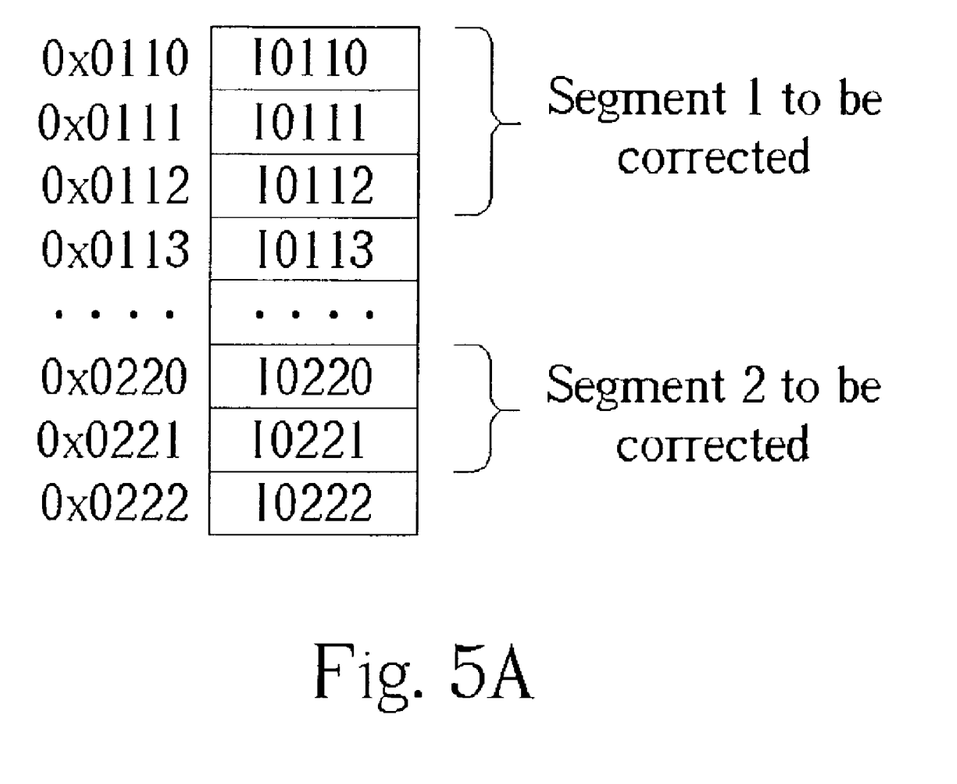
FIG. 5A is an example of a program ROM according to the present invention.

FIG. 5A is an example program ROM 22 comprising instructions I0110 through I0222 located at the addresses 0x0110 through 0x0222 respectively. Assume that instructions I0110 through I0112 and I0220 through I0221 are faulty and require correction.

Figure 5B:
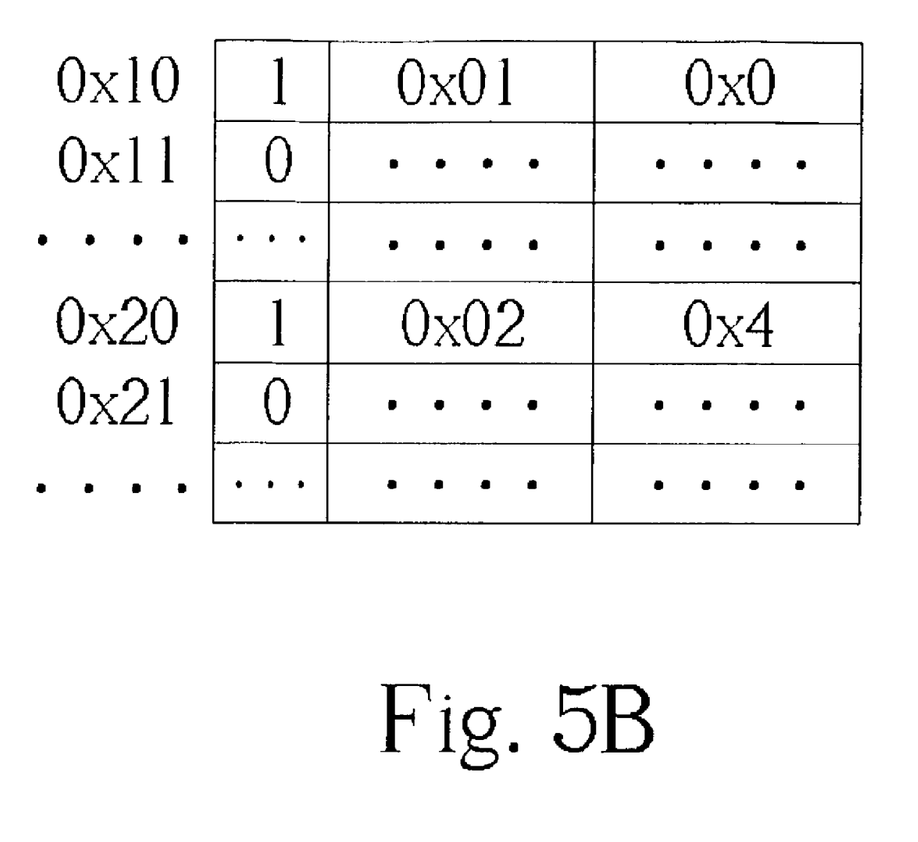
FIG. 5B is an example of an address RAM corresponding to the program ROM of FIG. 5A.

FIG. 5B illustrates the address RAM 26 after correction code is loaded into it. Note that bit 17, the valid bit, is set to "1" at the addresses 0x10 and 0x20 and bit 17 is set to "0" at all remaining entries in the address RAM 26.

Figure 5C:
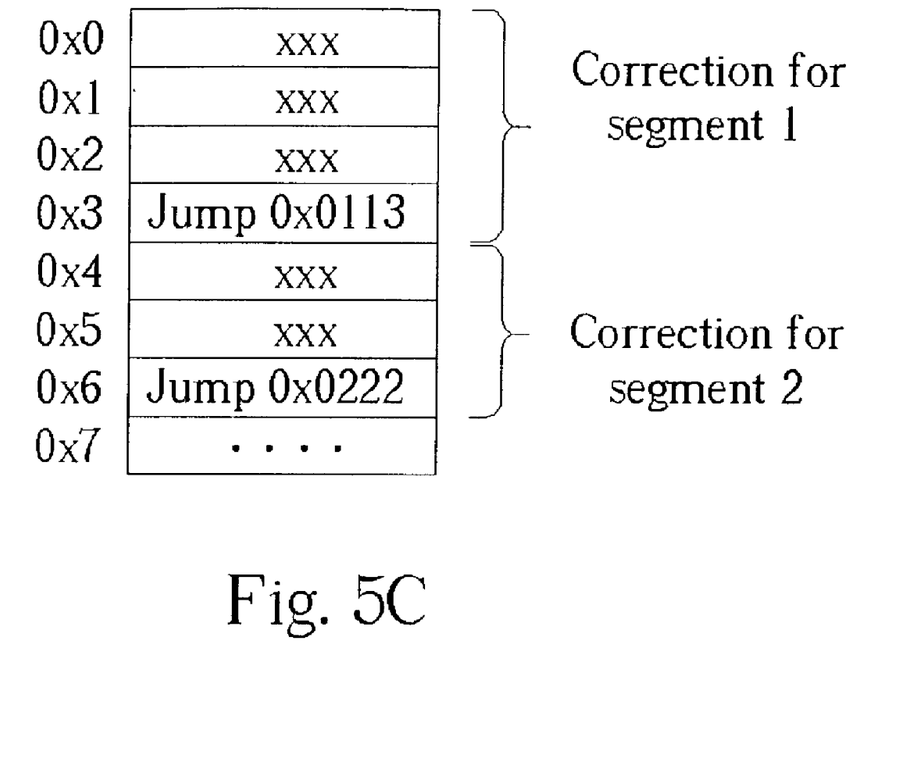
FIG. 5C is an example of a program RAM corresponding to the program ROM of FIG. 5A and the address RAM of FIG. 5B.

FIG. 5C illustrates a portion of the program RAM 24 content after correction code is loaded into it. The program RAM 24 comprises two corrected code segments corresponding to the two segments of faulty code in program ROM 22. Note that each segment ends with an unconditional jump back to the appropriate location in program ROM 22. Also, note that the segments in program RAM are continuous and waste no space.

Now assume that the program counter 20 has a current value of 0x0110 that is supplied to the program ROM 22, the program RAM 24, and the address RAM 26 simultaneously. The program ROM 24 selects and outputs an instruction located at the address in program ROM 24 specified by the bits 14–0 of the program counter 20. These 15 bits indicate the page and the offset value for the current instruction. Additionally, the address RAM 26 selects and outputs an entry based on bits 7–0 of the program counter 20.

Next, the address detection unit 28 determines if the instruction output by the program ROM 22 is faulty and needs to be corrected. The comparator 50 checks if the page number in the program counter 20 is the same as the page number in the entry outputted from the address RAM 26. The address used to select the entry of address RAM 26 for output is the same as the page offset for the current instruction (bits 7–0 of the program counter 20). Therefore, if the page number of the program counter 20 is the same as the page number in the output of the address RAM 26, it can be certain that the entry outputted from the address RAM 26 corresponds directly with the current instruction. If the valid bit (bit 17) in the output of the address RAM 26 is a "1", correction to the code in the program ROM 22 is necessary.

In FIG. 5A, the program counter 20 is pointing to 0x0110. Therefore, the address 0x10 (least significant 8 bits) is selected from the address RAM 26. A look at FIG. 5B shows that the entry at 0x10 of the address RAM 26 comprises a valid bit of "1", a page number of "0x01", and a jump address of "0x0". Because the page numbers match and the valid bit is set to "1", correction of the code in the program ROM 22 at the address 0x0110 is indicated. Therefore, the jump address (0x0) is added to the offset (0x8000) corresponding to the base address of the program RAM 24 and the sum is placed into the program counter 20 to be used during the next cycle.

Now, the value in the program counter 20 reads 0x8000 (0x8000+0x0), which is the location of the corrected code segment in the program RAM 24 shown in FIG. 5C. Therefore, 0x8000 is sent to the program ROM 22, the program RAM 24, and the address RAM 26. Because the address 0x8000 has a "1" in bit number 15 (correction bit) of its binary representation, the multiplexer 30 now selects the output of the program RAM 24 for forwarding to the instruction register 32 for further processing.

Like manner processing continues with the instructions located at 0x8000, 0x8001, and 0x8002. When the program counter 20 is equal to 0x8003, the fetched instruction is a jump to address 0x0113, which is a location in program ROM 22 immediately after the faulty code. Note that the correction bit (bit 15) of the program counter 20 is reset to "0" by the jump, causing the multiplexer 30 to again select output from the program ROM 24 for further processing.

Normal execution continues until the program counter 20 equals 0x0220 where the address detection unit 28 issues another hit. The jump address 0x4 is added to the offset 0x8000 and the result (0x8004) is again placed in the program counter 20. Note that the jump address (0x8004) immediately follows the previous corrected code segment in program RAM 24, wasting no space and allowing for easier programming. In the next cycle, the correction bit (bit 15) of the program counter 20 directs the multiplexer 30 to select the output from the program RAM 24 for further processing. When the program counter 20 reaches 0x8006, another jump is encountered and 0x0222 is placed into the program counter 20, returning execution to the program ROM 22.

In contrast to the prior art, the present invention makes use of continuous program RAM to hold corrected code segments making programming easier and a more efficient use of RAM space. Obviously, the EEPROM or SRAM of the present invention permits the microprocessor system to be updated as needed, extending the life of the device. Finally, the present invention allows a single microprocessor system architecture to function with a wide range (0–256) of code corrections without pre-knowledge of the kinds and quantities of corrections that the mask ROM may require and without the expense of additional hardware, reducing manufacturing costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A microprocessor system for correcting a faulty program code segment in a program ROM of an embedded microprocessor system, the microprocessor system having a program counter, the program counter comprising binary bits for storing the address of the next program code segment to be executed, the program correcting apparatus comprising:

a program RAM for storing a program code segment that is executed in place of the faulty program code segment stored in the program ROM;

an address RAM for storing a plurality of correction entries, one correction entry being accessed and output according to a least significant bits portion of a value in the program counter;

an address detection unit connected to the program counter and the output of the address RAM, the address detection unit being capable of determining if a program code segment at an address in the program RAM specified by the correction entry outputted from the address RAM is to be executed;

wherein when the address detection unit determines that a program code segment at an address in the program RAM is to be executed, the address in the program counter is changed to access the program code segment in the program RAM.

2. The program correcting apparatus of claim 1 wherein each correction entry of the address RAM comprises a valid bit field for flagging the correction entry as comprising valid correction information, a page number field for determining whether the correction entry corresponds to a page number currently in the program counter, and a jump address for specifying a location in the program RAM of the program code segment to be executed in place of the faulty program code segment.

3. The program correcting apparatus of claim 2 wherein the address detection unit comprises one comparator with one input of the comparator connected to the output of the address RAM and another input of the comparator connected to the program counter.

4. The program correcting apparatus of claim 3 wherein the address detection unit further comprises an AND operator with one input of the AND operator receiving an output of the comparator and another input of the AND operator receiving the valid bit field of the outputted correction entry of the address RAM.

5. The program correcting apparatus of claim 4 wherein the address detection unit determines that a program code segment at an address in the program RAM is to be executed by comparing the page number of the outputted correction entry with the page number in the program counter, if the page numbers are the same and the valid bit of the outputted correction entry indicates the program code segment at the address in the program ROM is to be replaced, the program code segment at the address in the program ROM is to be replaced, if the page numbers are not the same or the valid bit of the outputted correction entry does not indicate the program code segment at the address in the program ROM is to be replaced, the program code segment at the address in the program RAM is not to be executed.

6. The program correcting apparatus of claim 1 further comprising a multiplexer having a first input receiving the output of the program ROM and a second input receiving an output of the program RAM, the multiplexer being coupled to the program counter such that if the most significant bit of the program counter indicates a corrected code segment, the multiplexer outputs the output of the program RAM, and if the most significant bit of the program counter does not indicate a corrected code segment, the multiplexer outputs the output of the program ROM.

7. The program correcting apparatus of claim 1 wherein the address RAM is part of the program ROM address space.

8. The program correcting apparatus of claim 1 wherein the address detection unit uses the outputted correction entry and the program counter to determine if a program code segment at an address in the program RAM specified by the correction entry outputted from the address RAM is to be executed.

9. A method for correcting a faulty program code segment in a program ROM of an embedded microprocessor system, the microprocessor system comprising a program counter for storing an address of the next program code segment to be executed, an address RAM for storing a plurality of correction entries, and a program RAM for storing corrected code segments, the method comprising:

accessing the address RAM with a least significant bits portion of the program counter to select one correction entry from the address RAM;

comparing a page number field in the selected correction entry with a page number in the program counter to determine whether the selected correction entry corresponds directly to the program counter;

if the selected correction entry corresponds directly to the program counter and a valid bit of the selected correction entry indicates a corrected code segment, using the selected correction entry to redirect the program counter to execute a corrected code segment.

* * * * *